UNITED STATES PATENT OFFICE 2,625,485

LARD CRYSTAL MODIFICATION PROCESS

William E. Dominick, Chicago, and De Witte Nelson, Elmhurst, Ill., assignors to Swift & Company, Chicago, Ill., a corporation of Illinois No Drawing. Application March 26, 1952, Serial No. 278,754

9 Claims. (Cl. 99—118)

The present invention relates to the treatment of lard, and more particularly to the production of lard and lard-containing products having improved properties.

Lard, commercially the most important triglyceride material from an animal source, is fat obtained from the fatty tissue of hogs by a heat, solvent or enzyme treatment of the fatty tissue. The most common method of obtaining lard from the fatty tissue of hogs is the so-called wet or steam rendering treatment in which the fat is separated from the tissue by means of pressure with hot water or steam to give what is known as prime steam lard. Another common method of obtaining lard is by the dry rendering process in which fat is removed from the fatty tissue by means of heat alone. The latter method of obtaining lard includes the kettle rendering process in which the fat is melted in a hot water or a steam jacketed kettle. Other methods of obtaining lard, such as solvent and enzymatic treatment of fatty animal tissue, while not widely used on a commercial scale, are potentially important sources of lard.

After recovering the lard from the fatty tissue, the lard is generally treated to impart certain desired characteristics thereto. Thus, the lard may be settled, bleached, refined, washed, filtered, and deodorized to yield a substantially odorless and tasteless product.

Lard is often further treated to impart thereto an improved appearance and a greater degree of plasticity, as when the lard is to be used in baked products. This improved appearance and plasticity may be obtained by means of a texturizing process which includes compounding therewith hardened lard and incorporating air therein while chilling. Of particular importance in the texturizing process is the chilling step. This chilling of the lard may be accomplished by means of chill rolls or an internal chilling machine. In the former method molten fat is picked up on the surface of the internally chilled rotating rolls and then subsequently scraped therefrom and further worked to give the lard a uniform plastic consistency. Chilling by means of an internal chilling machine is accomplished by passing molten fat through a series of vertical or horizontal units where the fat is supercooled and allowed to solidify while being rapidly worked. The lard product treated in the foregoing manner is generally employed as a shortening. Heretofore, the appearance and plasticity of the final product have depended to a great extent on the nature of the foregoing chilling operation, and the final plasticity has been highly sensitive to the conditions of the chilling step. For this reason the operating conditions in the chilling step have necessarily been very critical and required very careful control.

The appearance is a very important characteristic of a commercial shortening product, particularly after the product has been held at the elevated temperatures commonly encountered during distribution and sale of the product. Solidified animal triglyceride material such as lard and lard-containing products frequently have a dull, waxy, and Vaseline-like appearance which becomes progressively more pronounced the longer the product is held. The appearance of lard and lard-containing products is generally considered much inferior to the appearance of vegetable shortenings which have been held under comparable storage conditions, as vegetable shortenings generally possess a smooth, satiny luster which is retained even after prolonged storage.

While lard has unsurpassed shortening properties, the hydrogenated vegetable oil shortenings of commerce are generally considered to have superior creaming and emulsifying properties as well as improved appearance and storing properties even after the lard has been texturized. It has been generally thought that one of the principal causes for the inferiority of the appearance, storing properties, creaming ability, and emulsifying properties of the lard is the crystal formation which the lard glyceride molecules assume upon solidifying. Although it has been found possible to temporarily alter the crystallization pattern of lard by packaging and holding the lard at a carefully controlled relatively low temperature, the lard crystals revert to their natural crystal form within a few days when the lard is allowed to stand at room temperature. For this reason, the foregoing temperature control during the packaging of lard is of no permanent or practical value when applied to lard which is distributed through commercial channels. It would therefore be desirable if lard could be made to permanently exhibit the same crystal behavior as hydrogenated vegetable oil shortening of commerce.

In order to achieve the desired improvements and to overcome the foregoing objectionable properties of lard and lard-containing products, it is an essential object of the present invention to permanently alter the normal crystallization habit of the lard to that of hydrogenated vegetable oil shortening.

An additional object within the broad scope of the invention is to provide lard in which the heat of crystallization normally associated with the said lard is substantially altered.

Another object of the invention is to provide a lard product having, after prolonged storage, improved appearance characterized by a smooth velvety sheen typical of hydrogenated vegetable oil shortening.

Still another object of the invention is to provide a lard product having substantially improved keeping qualities.

Another object of the invention is to provide a lard-containing product having improved plastic properties, including improved pliability and workability.

A further object of the invention is to provide a lard product having properties which equal or excel those of vegetable shortening while maintaining the superior shortening characteristic of lard.

A still further object of the invention is to provide a satisfactory lard product which can be texturized with a greater degree of flexibility in the texturizing operating conditions.

Additional objects of the invention will be apparent from the description and claims to follow.

In accordance with the present invention, it is proposed to subject lard to a heat treatment in the presence of a substance capable of changing the crystallization properties thereof under conditions which do not cause an appreciable change in the melting point of the glyceride material or a significant change in the distribution of the several types of triglyceride molecules in the fatty material being treated. The reaction which modifies the triglyceride molecules is highly complex and the mechanism is not completely understood. It has been observed, however, that the crystal habit and the heat of crystallization of the triglyceride molecules of lard are very significantly affected. And, since the substances capable of modifying the crystallization properties of triglyceride molecules do not become part of the crystal modified triglyceride molecules, the reaction appears to be catalytic. Therefore, the effective substances are herein referred to as crystal modifying catalysts.

In marked contrast with the previous method of catalytically treating triglyceride materials, the herein-disclosed crystal modifying treatment does not cause an appreciable change in the chemical composition of the fatty acid groups of the glyceride molecules, nor a significant change in the proportions of the several types of glyceride molecules in the lard being treated. Thus, there appears to be no significant amount of interesterification of the glyceride molecules under the conditions employed in the present invention.

More particularly the present invention contemplates heating lard at a temperature above the melting point of the highest melting component of said lard in the presence of a crystal modifying catalyst for a period of time sufficient to change the normal crystallization habits of the said lard.

It has been found that the alkali metal hydroxides can be used as crystal modification catalysts in the herein-disclosed process for accomplishing the purposes of the present invention. More specifically, dispersions of the alkali metal hydroxides have been found to be particularly effective as crystal modification catalysts. The foregoing dispersions may be either prepared prior to adding to the fatty material being crystal modified or may be formed in situ. The preformed alkali metal hydroxide dispersions preferably are stable anhydrous suspensions of the hydroxides in an inert media. Dispersions of sodium hydroxide, for example, may be prepared in inert hydrocarbons such as toluene, xylene, naphtha, kerosene, white oil, petroleum jelly, paraffin, and naphthalene, or in other organic medium which does not appreciably react with the sodium hydroxide. The particular dispersing medium is preferably selected so as to be easily removable from the material being treated. Dispersions containing as much as 50 per cent by weight of alkali metal hydroxides can be readily prepared and are stable at elevated temperatures.

The preparation of an alkali metal hydroxide dispersion such as sodium hydroxide dispersion is relatively simple and may be effected in several ways. For example, the solid sodium hydroxide may be ground to any desired particle size by grinding a mixture of the solid hydroxide with an inert liquid such as toluene or xylene, and passing the mixture through a wet grinding mill such as the ordinary type of ointment mill or colloid mill. The solid alkali sodium hydroxide may also be micropulverized in a dry atmosphere so as to avoid hydration to give any desired particle size, and mixing the anhydrous pulverized alkali hydroxide with a suitable inert solvent, such as the hydrocarbons, comprising toluene, xylene, naphtha, kerosene, naphthalene, and the like. In some instances stabilizing and dispersing agents may be used to facilitate the formation of a suitable dispersion. The following compounds have been found of value in producing suitable dispersions: oleic acid, oleic acid and carbon, fatty monoglycerides, dimerized linoleic acid, fatty amines, and pyridine.

It is frequently convenient to form the anhydrous alkali metal hydroxide dispersion directly in the material being crystal modified. Thus, a dispersion of sodium hydroxide in lard can be readily prepared, for example, by micropulverizing to produce an anhydrous finely subdivided sodium hydroxide and adding the anhydrous hydroxide directly to the batch of lard to be crystal modified. A uniform dispersion is formed by agitating the lard to which the anhydrous hydroxide has been added with a high-speed agitator.

The concentration of catalyst depends somewhat upon the condition under which the alkali metal hydroxide catalyst is used and also that of the fatty acid material being treated and generally varies between about 0.5 per cent and 2.0 per cent by weight of the alkali metal hydroxide, although larger amounts of catalyst do not prevent modification. If the fatty acid material is refined to remove all free fatty acids and the moisture completely driven out of the lard prior to treating with the crystal modification catalyst, a smaller concentration of catalyst could be used. It has also been observed that a lard having a high peroxide value requires a larger amount of catalyst to completely crystal modify than a lard which has a low peroxide value.

The time of treatment required to produce crystal modified lard varies with the temperature and the concentration of catalyst employed and must be carefully correlated in order to produce crystal modified lard. At the lower temperatures the speed of reaction is extremely slow. The minimum temperature at which the herein-disclosed crystal modification reaction can be carried out is the temperature at which the highest melting point constituent of the material being treated will just remain in solution, since removal of the higher melting point constituents changes the chemical composition of the lard and is therefore undesirable. When the concentration of catalyst is reduced below the optimum concentration, more time is required to complete the crystal modified reaction, and if the critical lowest concentration of catalyst is not used, modification does not occur even after prolonged treatment. When a sufficient quantity of catalyst is used, the time required for crystal modification treatment is dependent primarily on the temperature at which the treatment is carried out. At temperatures between about 150° C. and 250° C. the crystal modification reaction proceeds rapidly and is generally completed in a period of two to four hours. Since incompletely modified lard shows improved properties, such as increasing pound cake volume, for only a short time after production and does not exhibit the same crystal habit as hydrogenated vegetable oil shortening nor the improved keeping properties of crystal modified lard, it is necessary to insure complete crystal modification as evidenced by a distinct change in the normal crystal form of the lard from the beta to the beta prime form. In commercial practice the crystal modification reaction is considered complete upon the forming of a reddish-brown or cocoa-brown color throughout the lard mixture. This change in color does not permanently impair the color of the final lard since it is substantially removed during the conventional bleaching treatment of lard.

The lard may be heated in the presence of the herein-disclosed catalyst at any stage of processing, and the beneficial results of the crystal modifying treatment are not impaired by subsequent processing such as deodorization and hydrogenation. It is also unnecessary to hold the crystal modified product at any particular temperature in order to retain the beneficial properties imparted to the material. Where it is desired to omit the treatments generally employed to impart improved characteristics, the rendered lard may advantageously be directly heated in the presence of the herein-disclosed catalysts to produce crystal modified lard.

The specific examples of the present invention given herein illustrate the treatment of lard with sodium hydroxide and potassium hydroxide as the crystal modifying catalysts. In all cases the treated lard possessed a striking appearance which was markedly different from that of untreated lard, particularly after the prolonged storage normally encountered during distribution, and the crystal modified lard had the characteristic satiny luster of vegetable shortening that readily distinguished it from the conventional lard of commerce. In addition, the plastic properties of the treated lard were superior and the pound cakes made therewith generally had a larger volume and a finer grain and texture than the cakes made with untreated lard. Although cake volume cannot be considered the standard for determining crystal modification, generally the dough prepared with the modified lard is capable of entrapping greater quantities of air than is the case with dough made with untreated lard. The texture and fine grain of the cakes also indicate a uniform dispersal of the air throughout the dough.

The specific examples to follow should be considered as merely illustrative of the herein-disclosed process and resulting product and should in no way be construed to limit the invention to the particular materials or conditions disclosed therein.

Example I

Prime steam lard (2,000 grams) was admixed with 1 per cent of a dispersion of sodium hydroxide in an equal weight of xylene, said percentage being based on the weight of the hydroxide in the lard. The mixture was heated at a temperature of 200° C. for a period of 4 hours with constant stirring. After cooling, sufficient water was added to hydrate the foots and cause separation of the treated lard in a separate layer. The treated lard was thereafter bleached and filtered.

The crystal modified lard was chilled and rapidly agitated in an ice bath so as to form a plastic mass as in the commercial texturizing operation. As a control, a portion of the original lard was also heated, chilled, and texturized in the foregoing manner. The catalytically treated lard was found to be softer, more plastic, and to have the texture and appearance of the hydrogenated vegetable oil shortening of commerce.

When X-ray diffraction studies of the lard were made before and after treatment similar to the methods described in Lutton, J. A. C. S., 67, 524 (1945), and Lutton, J. A. O. C. S., 27, 276 (1950), the X-ray diffraction pattern pictures of the crystal modified lard showed that the treated crystal modified lard had crystallized in the beta prime form, whereas the unmodified control sample of the lard had crystallized in the usual beta crystal form characteristic of regular lard.

After holding the modified lard and the control sample for a period of four weeks at a constant temperature of 100° F. and thereafter baking pound cakes with each of the lard samples, it was found that the crystal modified lard produced a pound cake having a volume substantially the same as the pound cake produced immediately after the lard was filled and tempered in the usual manner, whereas the unmodified control sample produced a pound cake which was over 300 cc. below the volume of the original pound cake made therewith. It is thus evident that the crystal modified lard is capable of retaining its desirable texture and plastic properties as well as its appearance for prolonged periods under extremely adverse storage conditions, whereas the unmodified lard loses its original appearance and performance characteristics when stored under similar conditions. This ability of crystal modified lard and compounded shortenings made therefrom to retain its improved appearance, texture and cake-baking properties after prolonged storage and on storage under adverse conditions normally encountered in commercial channels is an extremely important characteristic of crystal modified lard. And, even in those instances when the increase in the volume of a pound cake originally produced by the crystal modification treatment is considered insignificant or only moderate as compared with the original lard, it has been consistently observed that the lard treated in accordance with the herein-disclosed process and shortenings made therewith retain their original desirable appearance, textural, and performance characteristics for a prolonged period of storage under adverse conditions, whereas the untreated lard and incompletely treated lard and lard-containing shortening products lose their desirable characteristics in a relatively short time under the same handling conditions which were made to simulate the handling and storing conditions frequently encountered in commercial channels.

Example II

Thoroughly dried prime steam lard (1,500 grams) was admixed with 2 per cent of a dispersion of sodium hydroxide in xylene, the said percentage being based on the weight of the sodium hydroxide in the dry lard, and the mixture heated for a period of 2 hours at a temperature of 215° C. with constant stirring. After cooling, sufficient water was added to hydrate the foots and cause separation of the treated lard in a separate layer. The modified lard was thereafter bleached and filtered.

The modified lard possessed a smooth, velvety sheen similar to hydrogenated vegetable oil shortening of commerce and was much superior in appearance and in textural properties to the control sample of unmodified lard. The X-ray diffraction patterns of the texturized crystal modified lard showed that the lard was crystallized in the same beta prime crystal form as hydrogenated cottonseed oil shortening and that the modified lard remained in the same crystal form as the hydrogenated cottonseed oil shortening after both had been stored for a period of 30 days at a temperature of 95° C.

Example III

Dried prime steam lard (1500 grams) was admixed with 2 per cent potassium hydroxide dispersed in xylene and heated at a temperature of 200° C. for 4 hours, said percentage being based on the weight of the hydroxide in the lard. After cooling, sufficient water was added to hydrate the foots and cause separation of the treated lard in a separate layer. The modified lard was thereafter filtered and texturized by agitating while being rapidly cooled. The plastic lard had a smooth, velvety appearance similar to that of hydrogenated vegetable oil shortening and a smooth, creamy consistency.

The modified lard and the original control lard had the following characteristics:

| | Modified Lard | Control Sample of Lard |
| --- | --- | --- |
| Free fatty acid | 0.07 | 0.56% |
| Melting Point | 108° F. | 112° C. |

Upon holding the crystal modified lard sample and the control sample in a constant temperature room at 75° F. for a period of two weeks, there was a marked difference in the consistency of the two samples. Whereas the control sample was decidedly hard and firm to the touch, the crystal modified lard was very much more pliable and soft to the touch. This marked contrast in the consistency of the two samples continued to exist after a storage period of one month at which time the test was discontinued. The foregoing observations regarding the change in consistency resulting from crystal modification have been found to be a characteristic difference between modified lard and unmodified lard and is evident when samples are stored at temperatures above about 45° F.

Example IV

Dried prime steam lard (1500 grams) was admixed with 2 per cent sodium hydroxide dispersed in xylene and heated at a temperature of 250° C. for 1.5 hours, said percentage being based on the weight of the hydroxide in the lard. After cooling, sufficient water was added to hydrate the foots and cause separation of the treated lard in a separate layer. The modified lard was thereafter filtered and texturized by agitating while being rapidly cooled. The plastic lard had a smooth, velvety appearance similar to that of hydrogenated vegetable oil shortening and a smooth, creamy consistency.

Example V

Dried prime steam lard (1500 grams) was admixed with 2 per cent sodium hydroxide dispersed in xylene and heated at a temperature of 180° C. for 5 hours, said percentage being based on the weight of the hydroxide in the lard. After cooling, sufficient water was added to hydrate the foots and cause separation of the treated lard in a separate layer. The modified lard was thereafter filtered and texturized by agitating while being rapidly cooled. The plastic lard had a smooth, velvety appearance similar to that of hydrogenated vegetable oil shortening and a smooth, creamy consistency.

Example VI

Dried prime steam lard (1500 grams) was admixed with 2 per cent sodium hydroxide and heated at a temperature of 200° C. for 4 hours, said percentage being based on the weight of the hydroxide in the lard. After cooling, sufficient water was added to hydrate the foots and cause separation of the treated lard in a separate layer. The modified lard was thereafter filtered and texturized by agitating while being rapidly cooled. The plastic lard had a smooth, velvety appearance similar to that of hydrogenated vegetable oil shortening and a smooth, creamy consistency.

The X-ray diffraction pattern pictures of samples of regular lard and of crystal modified lard taken according to the above mentioned show that the stable crystal habit of the treated lard at the room temperatures encountered during sales, distribution, and storage, is no longer the same as that of regular untreated lard and has been transformed from its natural beta phase to the beta prime phase. Furthermore, when the X-ray diffraction pattern pictures of crystal modified lard, hydrogenated cottonseed oil, and hydrogenated cottonseed oil shortenings, are compared, it is found that each has the same crystal habit and crystallizes in the beta prime phase as its normal and stable form.

The improved lard obtained in accordance with the herein described invention can be used as an all-purpose shortening in place of both the animal and vegetable shortenings heretofore discriminately employed because of their peculiar properties. The improved lard may thus be advantageously employed in the manufacture of cakes and icings as well as in the preparation of bread and pie crust. Although we have illustrated the invention as being particularly applicable to baked goods, it is also applicable to other food products, such as the manufacture of candy and fried products. It is also understood that the improved fat may be advantageously used in lubricants, greases, cosmetics, medicated ointments, and in many other industrial applications. The improved lard of the present invention can also be advantageously used in the preparation of an improved margarine product.

From the foregoing specific examples describing the characteristics and improved properties and new uses of crystal modified lard it will be very apparent to those skilled in the art that crystal modified lard is particularly useful in the preparation of improved shortening products. Thus, any shortening product which has heretofore consisted of a substantial proportion of animal triglyceride material, such as lard, will be provided with very substantially improved appearance and baking properties, particularly after holding at the usual temperatures encountered in commercial distribution channels, by substituting crystal modified lard for all or part of the unmodified lard in the shortening. The resulting shortening product has the desirable properties characteristic of the hydrogenated vegetable oil shortening of commerce while retaining the superior shortening properties of lard. The improved results obtained with crystal modified lard are in no way dependent upon the presence of monoglycerides, since the desirable properties are not lost as a result of the deodorization treatment.

The term "textural properties" as used herein and in the claims refers to those performance characteristics of the fatty material which are indicative of the utility of the material as a shortening agent in baked goods, such as the Wet Cream test, the pound cake specific gravity, and the pound cake volume.

The terms "crystal modification and "crystal modified lard" as used in the specification and claims to follow designate a transformation of the normal and stable crystal structure from one crystal form to another, and in lard specifically designates a change from the beta to the beta prime crystal phase.

Obviously, many modifications and variations of the invention as hereinbefore set forth may be made without departing from the spirit and scope thereof, and therefore only such limitations should be imposed as are indicated in the appended claims.

We claim:

1. A process of treating lard to improve its resistance to deterioration of physical appearance and textural properties, comprising contacting lard with an alkali metal hydroxide as a crystal modification catalyst at a temperature between the temperature at which the highest melting point constituent of the lard just remains in solution and 250° C. until permanently changing the normal crystallization habit and normal X-ray diffraction pattern of the said treated lard to resemble that of hydrogenated vegetable oil shortening, deactivating the said catalyst, and recovering the crystal modified lard free of the said catalyst.

2. A process of treating lard to modify permanently the crystal structure and substantially improve its resistance to deterioration of physical appearance and textural properties, comprising contacting lard with an alkali metal hydroxide acting as a crystal modification catalyst at a temperature between about 150° C. and 250° C. until permanently changing the normal crystallization habit and normal X-ray diffraction pattern of the said treated lard to resemble that of hydrogenated vegetable oil shortening, deactivating the said catalyst, and recovering the crystal modified lard free of the said catalyst.

3. In the process of treating lard wherein lard is heated in the presence of a crystal rearrangement catalyst, the improvement comprising heating lard in the presence of at least about 0.5 per cent based on the weight of the said lard of a finely divided anhydrous alkali metal hydroxide at a temperature between about 150° C. and 250° C. for a period of between about 1 hour and 5 hours until the normal crystallization habit and normal X-ray diffraction pattern of the treated lard are permanently changed to resemble that of hydrogenated vegetable oil shortening.

4. A process substantially as described in claim 3 wherein the catalyst is a dispersion of sodium hydroxide.

5. A process substantially as described in claim 3 wherein the catalyst is a dispersion of potassium hydroxide.

6. A process substantially as described in claim 3 wherein the lard is heated in the presence of a sodium hydroxide dispersion as the catalyst at a temperature between about 180° C. and 225° C. for a period of between about 2 hours and 4 hours.

7. In the process of treating lard wherein lard is heated in the presence of a crystal modification catalyst to permanently alter the normal crystallization habit of the said lard, the improvement which comprises heating lard in the presence of a dispersion of anhydrous sodium hydroxide in an inert carrier at a temperature between about 200° C. and 225° C. for a period of between about two hours and four hours until the normal crystal structure and X-ray diffraction pattern of the treated lard are permanently changed to resemble that of hydrogenated cottonseed oil shortening.

8. A process substantially as described in claim 7 wherein the sodium hydroxide is dispersed in an inert hydrocarbon.

9. A process of treating lard to modify permanently the crystal structure thereof and substantially improve its resistance to deterioration of physical appearance and textural properties, comprising heating lard substantially free of moisture at a temperature of about 200 °C. with about 2.0 per cent anhydrous sodium hydroxide dispersed in the inert hydrocarbon carrier xylene based on the weight of the hydroxide in the dry lard until the normal crystallization habit and X-ray diffraction pattern of the treated lard in its normal and stable form at room temperature is permanently changed to resemble that of hydrogenated cottonseed oil shortening, deactivating the said catalyst, and recovering the crystal modified lard free of the said catalyst.

WILLIAM E. DOMINICK.
DE WITTE NELSON.

No references cited.